(12) United States Patent
Corda

(10) Patent No.: US 9,039,274 B1
(45) Date of Patent: May 26, 2015

(54) COMPACT, PORTABLE BLENDER SYSTEM

(71) Applicant: Chris J. Corda, St. Petersburg, FL (US)

(72) Inventor: Chris J. Corda, St. Petersburg, FL (US)

( * ) Notice: Subject to any disclaimer, the term of this patent is extended or adjusted under 35 U.S.C. 154(b) by 10 days.

(21) Appl. No.: 14/012,451

(22) Filed: Aug. 28, 2013

(51) Int. Cl.
*B01F 7/16* (2006.01)
*B01F 15/02* (2006.01)
*A47J 43/046* (2006.01)

(52) U.S. Cl.
CPC ..................... *A47J 43/046* (2013.01)

(58) Field of Classification Search
CPC .............................. A47J 43/042; A47J 43/046
USPC .................................................. 366/142, 205
See application file for complete search history.

(56) References Cited

U.S. PATENT DOCUMENTS

| | | | |
|---|---|---|---|
| 4,487,509 A | 12/1984 | Boyce | |
| D281,945 S | 12/1985 | Boyce | |
| 4,887,909 A | 12/1989 | Bennett | |
| 6,609,821 B2 | 8/2003 | Wulf et al. | |
| 6,959,562 B2 | 11/2005 | Navedo et al. | |
| 7,371,004 B1* | 5/2008 | Branson et al. | 366/130 |
| 7,422,361 B2* | 9/2008 | Pryor et al. | 366/197 |
| 7,422,362 B2 | 9/2008 | Sands | |
| 7,717,613 B1 | 5/2010 | Epps | |
| 7,766,540 B2 | 8/2010 | Saunders et al. | |
| 8,066,426 B2* | 11/2011 | Sandford et al. | 366/205 |
| 2002/0089894 A1 | 7/2002 | Parlor, Sr. | |
| 2013/0129884 A1* | 5/2013 | Fedor | 426/431 |
| 2014/0301155 A1* | 10/2014 | Montgomery | 366/142 |

OTHER PUBLICATIONS

Hamilton Beach: Single-serve blender use and care guide, http://useandcares.hamiltonbeach.com/files/840203201.pdf, 24 pages, May 12, 2011.*
Amazon.com: Hamilton Beach 51103 Single Serve Blender with Travel Lid, http://www.amazon.com/Hamilton-Beach-51103-Single-Blender/dp/B002V8ZEXW, 7 pages, Oct. 28, 20014.*

* cited by examiner

*Primary Examiner* — Tony G Soohoo
*Assistant Examiner* — Elizabeth Insler

(57) ABSTRACT

A compact portable blender system features a base unit. A base unit top surface features a recess having an "L" shaped locking slot and a motor with a drive gear. A base unit bottom surface features a removable power supply. The base unit features a power charger, a removable cord, a cord storage cavity, a power switch, and a power indicator. The system features a blending container. A blending blade unit is located on a container bottom. A blade drive gear located on a blending blade unit bottom and a blending blade is located on a blending blade unit top. The blending blade unit features a locking tab located on a blending blade unit side wall. The system features a container lid having an aperture. The container lid features a cover located over the aperture on a container lid top.

6 Claims, 6 Drawing Sheets

COMPACT, PORTABLE BLENDER SYSTEM

FIELD OF THE INVENTION

The present invention relates to blenders, or more specifically, portable blenders that operate from battery power.

BACKGROUND OF THE INVENTION

Blenders have been used for many years to combine solids and liquids into a drinkable liquid. Often ice or frozen fruits or vegetables are blended to create natural and delicious frozen drinks. Most blenders are considered a kitchen countertop appliance and run off electricity. The present invention features a compact portable blender system for blending fruits, vegetables, ice, and liquid while traveling that uses rechargeable battery power.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a compact portable blender system for blending fruits, vegetables, ice, and liquid while traveling. In some embodiments, the system comprises a base unit. In some embodiments, a base unit top surface comprises a recess located in the base top having an "L" shaped locking slot located on a recess interior surface side wall. In some embodiments, the base unit comprises a motor with a drive gear centrally located on the base top. In some embodiments, the base unit comprises a removable power supply located on a base bottom. In some embodiments, the base unit comprises a power charger located therein. In some embodiments, a removable cord is operatively connected to the power charger via a port located on a base unit side wall. In some embodiments, the cord is designed to insert into a direct current charging port. In some embodiments, a cord storage cavity is located in the base unit. In some embodiments, the base unit comprises a power switch located on the base unit side wall. In some embodiments, the base unit comprises a power indicator located on the base unit side wall.

In some embodiments, the system comprises a blending container. In some embodiments, a blending blade unit is located on a container bottom. In some embodiments, the blending blade unit comprises a blade drive gear located on a blending blade unit bottom. In some embodiments, the blade drive gear interfaces with the drive gear. In some embodiments, the blending blade unit comprises a blending blade located on a blending blade unit top. In some embodiments, the blending blade unit comprises a locking tab located on a blending blade unit side wall. In some embodiments, a volume measurement indicator is located on the container side wall.

In some embodiments, the system comprises a container lid located on the container top. In some embodiments, the container lid comprises an aperture located thereon. In some embodiments, the container lid comprises a cover located over the aperture on a container lid top.

DESCRIPTION OF PREFERRED EMBODIMENTS

Figure 1:
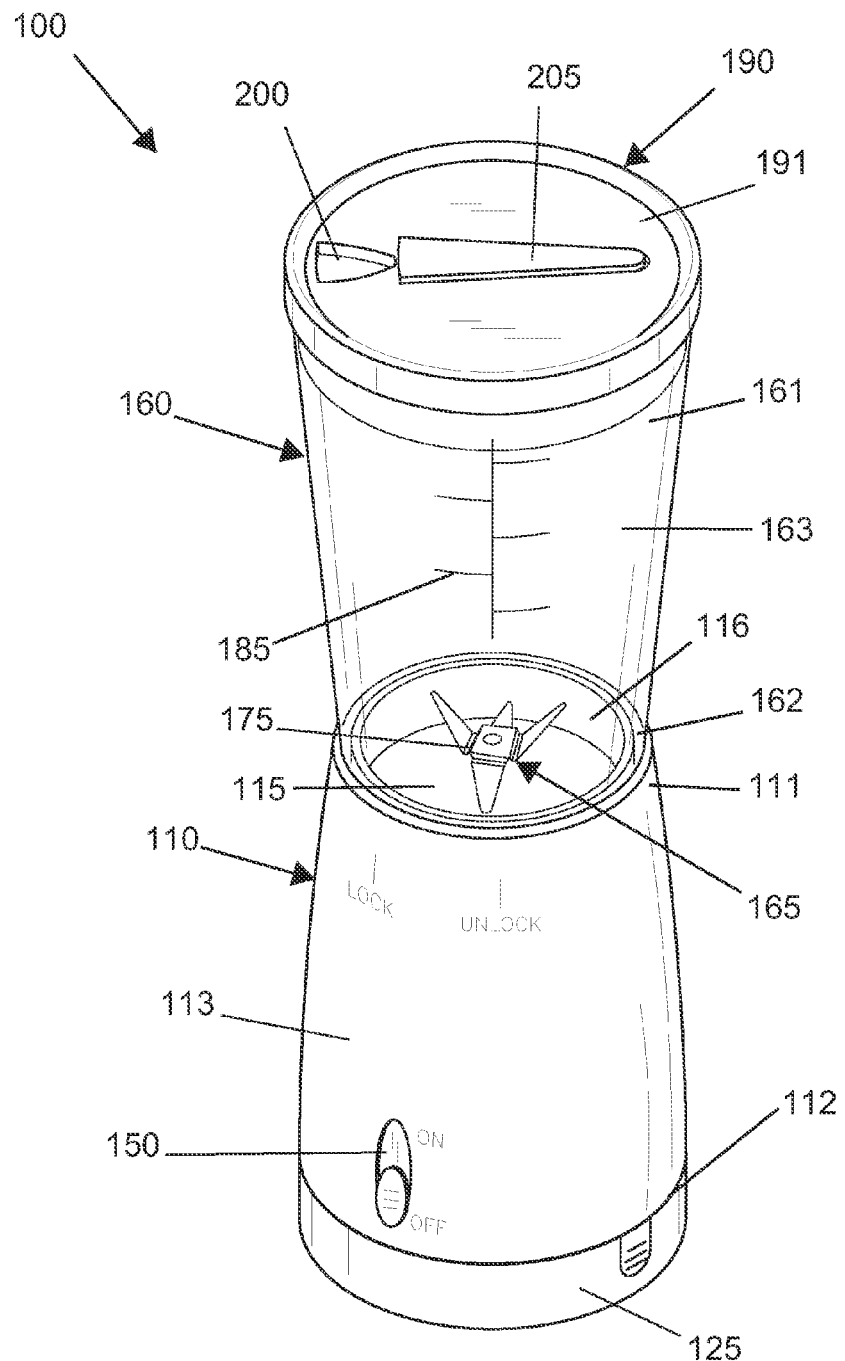
FIG. 1 shows a perspective view of the present invention.
Figure 2:
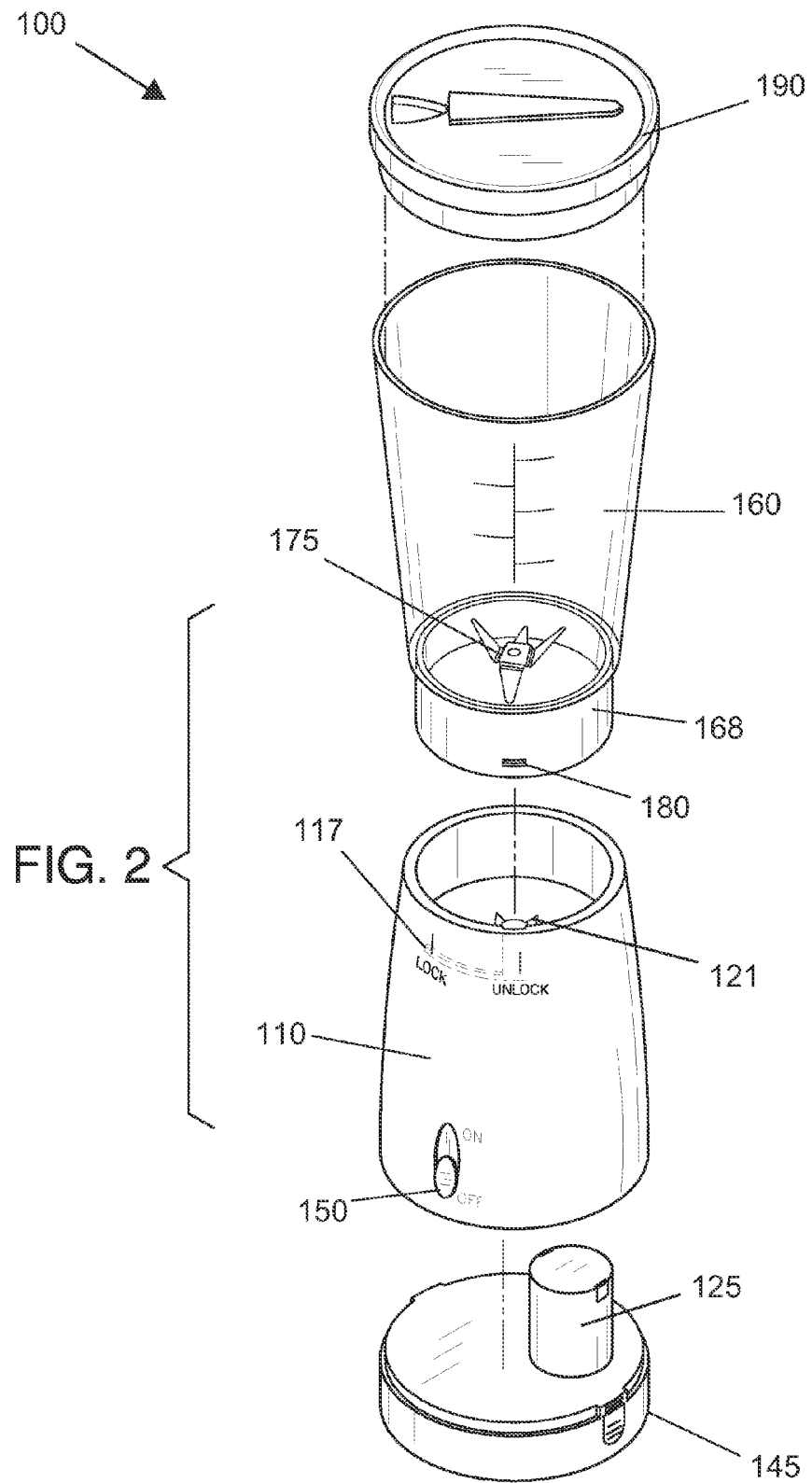
FIG. 2 shows an exploded view of the present invention.
Figure 3:
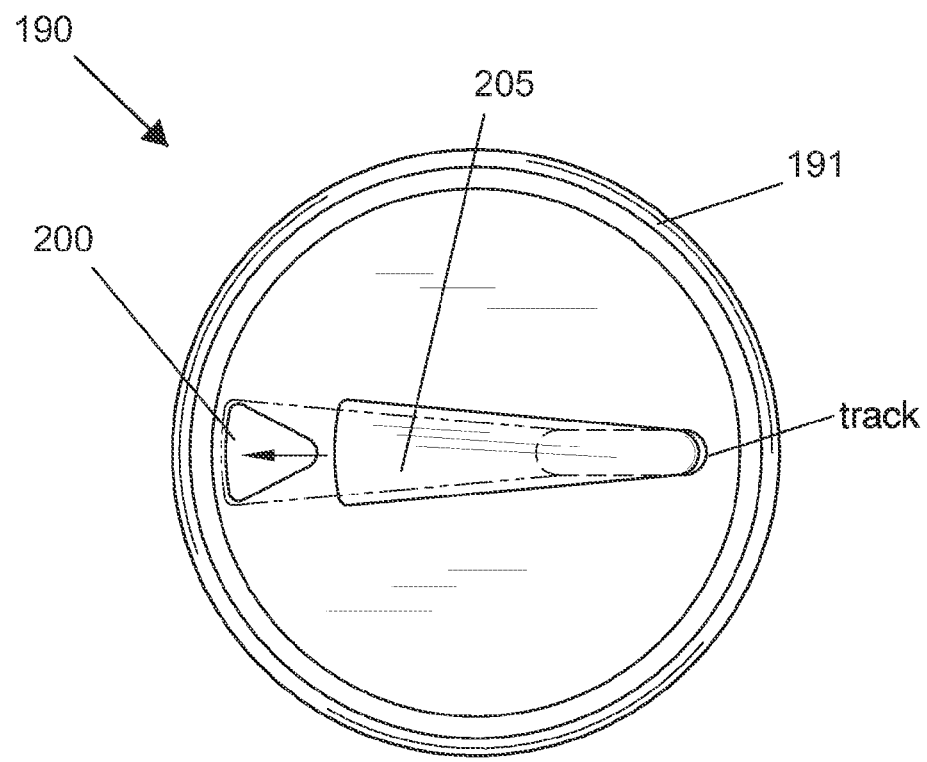
FIG. 3 shows a top view of the present invention.
Figure 4:
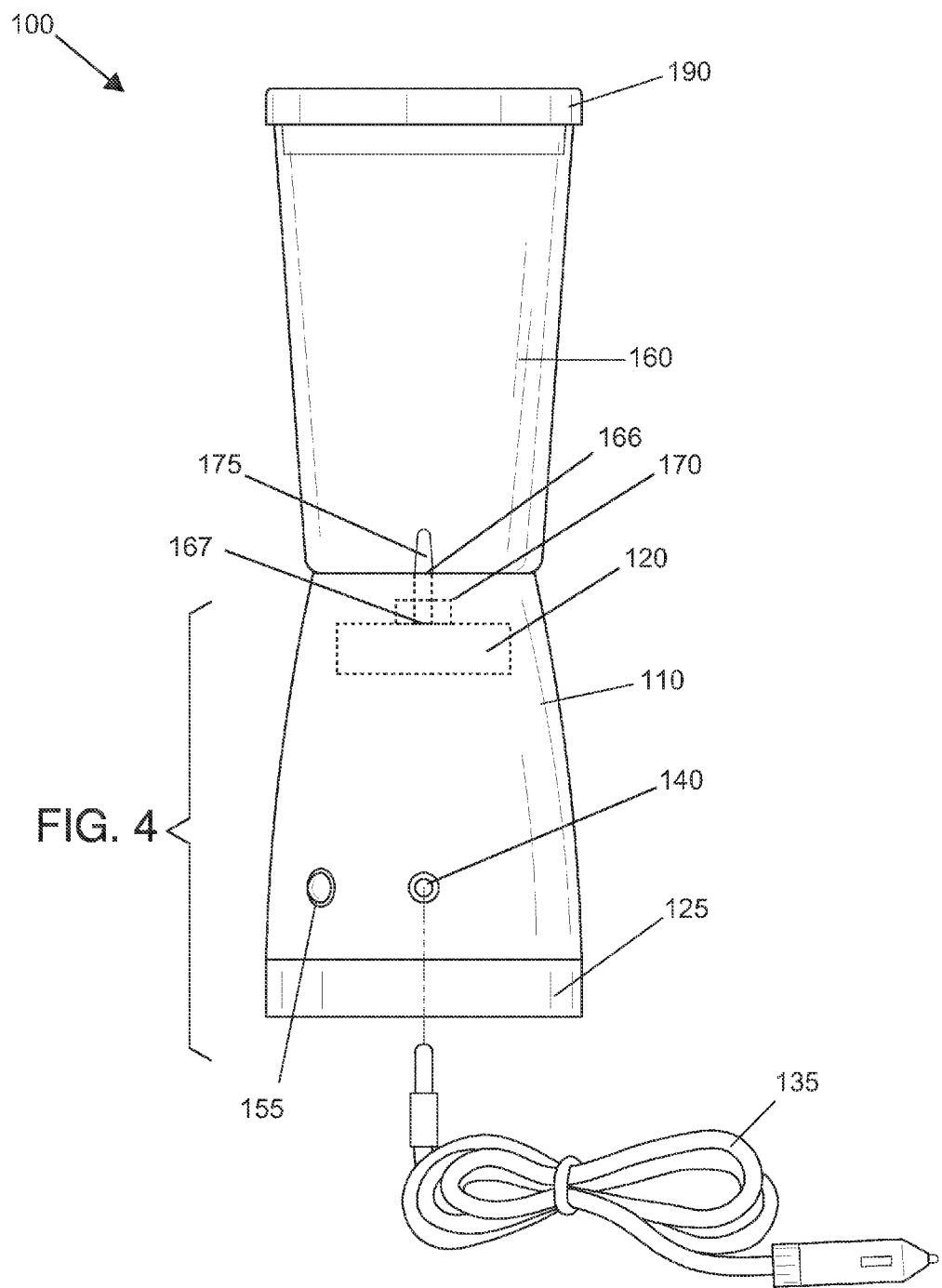
FIG. 4 shows a side view of the present invention.
Figure 5:
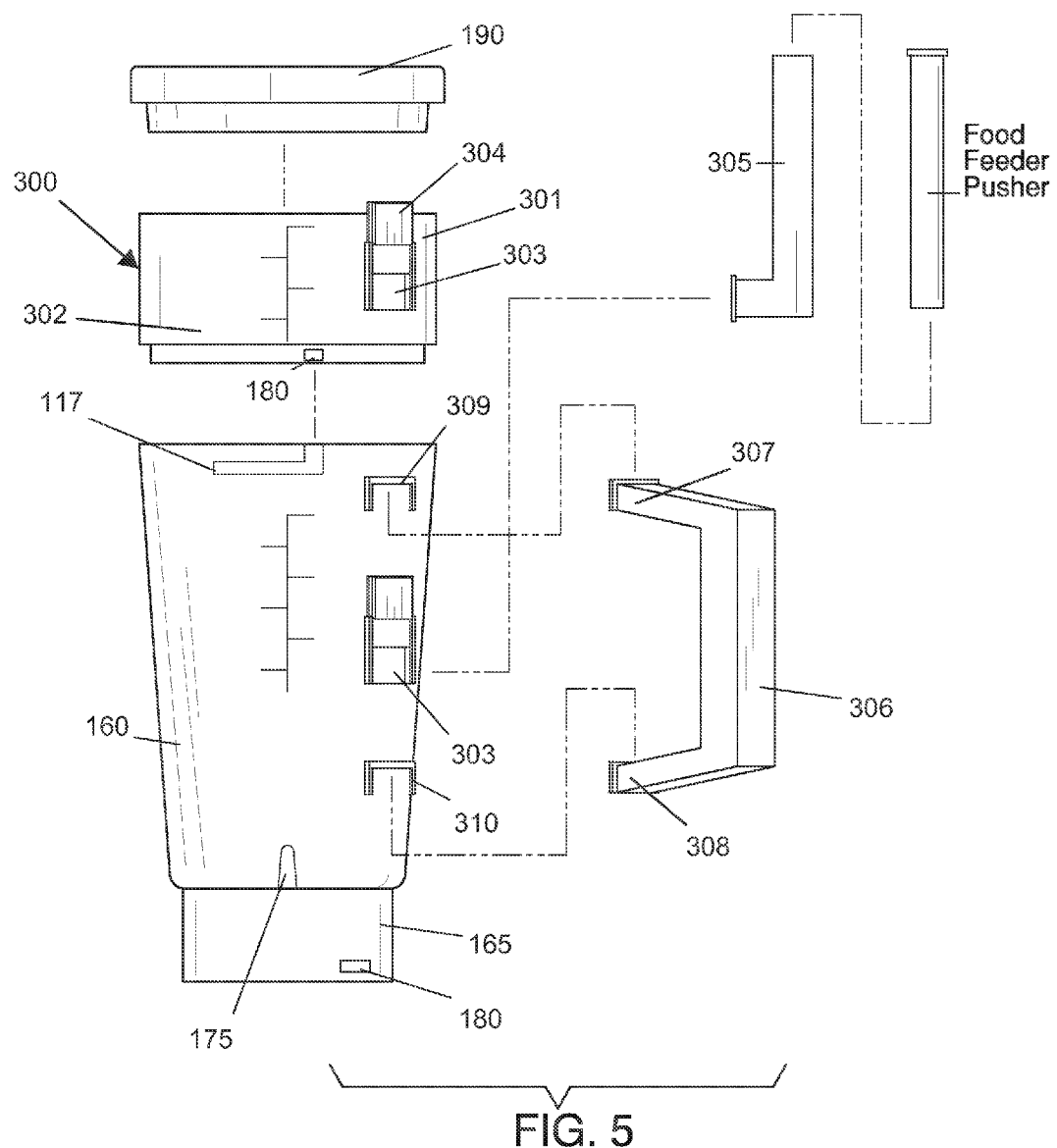
FIG. 5 shows an exploded view of the blending container, the container lid, and the container extension of the present invention.
Figure 6:
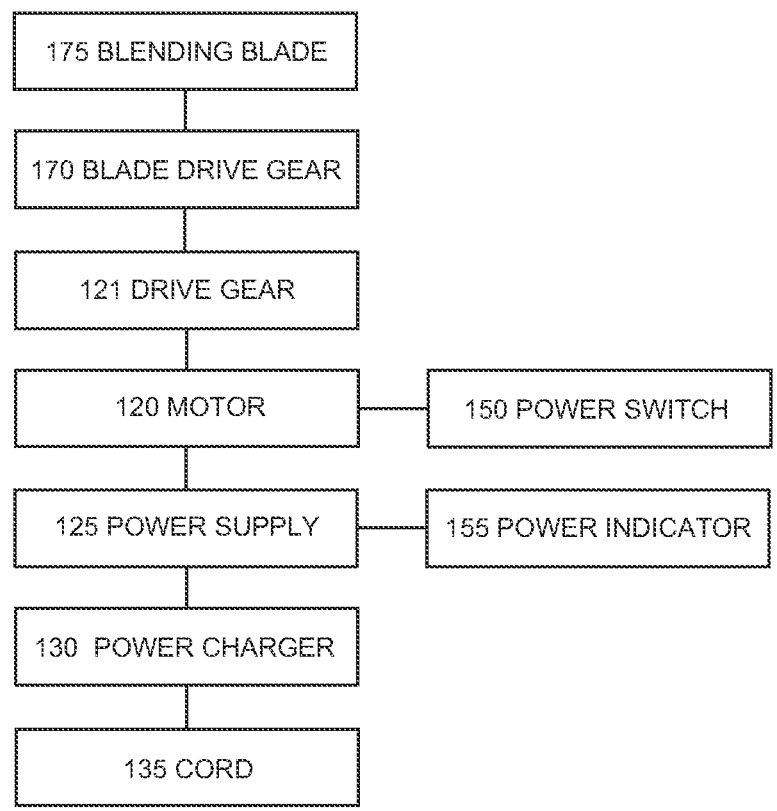
FIG. 6 shows a schematic view of the present invention.

Following is a list of elements corresponding to a particular element referred to herein:
100 Portable blender system
110 Base unit
111 Base top
112 Base bottom
113 Base side wall
115 Recess
116 Recess interior surface side wall
117 Slot
120 Motor
121 Drive gear
125 Power supply
130 Power charger
135 Cord
140 Port
145 Cord storage cavity
150 Power switch
155 Power indicator
160 Blending container
161 Container top
162 Container bottom
163 Container side wall
165 Blending blade unit
166 Blending blade unit top
167 Blending blade unit bottom
168 Blending blade unit side wall
170 Blade drive gear
175 Blending blade
180 Locking tab
185 Volume measurement indicator
190 Container lid
191 Container lid top
200 Aperture
205 Cover
300 Container extension
301 Container extension top end
302 Container extension bottom end
303 Food feeder aperture
304 Sliding door
305 Food feeder channel
306 Handle
307 Handle first end
308 Handle second end
309 First handle attachment point
310 Second handle attachment point Referring now to FIG. 1-6, the present invention features a compact portable blender system (100) for blending fruits, vegetables, ice, and liquid while traveling. In some embodiments, the system (100) comprises a base unit (110) having a base top (111), a base bottom (112), and a base side wall (113). In some embodiments, the base top (111) comprises a recess (115) located therein. In some embodiments, the recess (115) comprises an "L" shaped locking slot (117) located on a recess interior surface side wall (116). In some embodiments, the recess (115) comprises two "L" shaped locking slots (117).

In some embodiments, the base unit (110) comprises a motor (120) with a drive gear (121) centrally located on the base top (111). In some embodiments, the base unit (110) comprises a removable power supply (125) located on the base bottom (112). In some embodiments, the removable power supply (125) is operatively connected to the motor (120).

In some embodiments, the base unit (110) comprises a power charger (130) located therein. In some embodiments, the power charger (130) is operatively connected to the power supply (125). In some embodiments, a removable cord (135) is operatively connected to the power charger (130) via a port (140) located on the base side wall (113). In some embodiments, the cord (135) comprises an end designed to insert into a direct current charging port. In some embodiments, a cord storage cavity (145) is located in the base unit (110) for storing the cord (135). In some embodiments, the cord (135) with the end designed to insert into the direct current charging port is inserted into a direct current charging port in an automobile for charging the power supply (125) via the power charger (130).

In some embodiments, the base unit (110) comprises a power switch (150) located on the base side wall (113). In some embodiments, the power switch (150) is operatively connected to the motor (120).

In some embodiments, the base unit (110) comprises a power indicator (155) located on the base side wall (113). In some embodiments, the power indicator (155) is operatively connected to the power supply (125).

In some embodiments, the system (100) comprises a blending container (160) having an open container top (161), a container bottom (162), and a conical container side wall (163). In some embodiments, a blending blade unit (165) is located on the container bottom (162). In some embodiments, the blending blade unit (165) comprises a blade drive gear (170) located on a blending blade unit bottom (167). In some embodiments, the blade drive gear (170) interfaces with the drive gear (121). In some embodiments, the blending blade unit (165) comprises a blending blade (175) located on a blending blade unit top (166). In some embodiments, the blending blade unit (165) comprises a locking tab (180) located on a blending blade unit side wall (168) thereon. In some embodiments, a volume measurement indicator (185) is located on the container side wall (163). In some embodiments, the locking tab (180) interfaces with the slot (117) and secures the blending container (160) to the base unit (110).

In some embodiments, the system (100) comprises a container lid (190) removably located on the container top (161). In some embodiments, the container lid (190) comprises an aperture (200) located thereon. In some embodiments, the container lid (190) comprises a cover (205) slidably located over the aperture (200) on a container lid top (191) thereon.

In some embodiments, for use, the blending container (160) is located on the base unit (110). In some embodiments, any combination of fruits, vegetables, ice, and liquid are placed in the blending container (160) for blending. In some embodiments, the container lid (190) is located on the blending container (160). In some embodiments, the power switch (150) is activated. In some embodiments, upon activating the power switch (150) the blending blade (175) is rotated via the motor (120) to blend the contents together. In some embodiments, the cover (205) is slid away from the aperture (200) for pouring the contents of the blending container (160).

In some embodiments, the blending container (160) is constructed from a glass or a clear dishwasher safe plastic. In some embodiments, the blending container (160) is about 16 ounces. In some embodiments, the blending container (160) is about 20 ounces. In some embodiments, the blending container (160) is about 24 ounces. In some embodiments, the blending container (160) is about 28 ounces. In some embodiments, the blending container (160) is about 32 ounces.

In some embodiments, the blending container (160) comprises a diameter between 2½" to 3" close to the container bottom (162). In some embodiments, the blending container (160) is designed to be placed in a drink holder of an automobile.

In some embodiments, the system (100) comprises a travel bag, wherein the travel bag is designed to fully contain the blender system (100). In some embodiments, the travel bag is cloth or canvas and comprises a drawstring to cinch an opening.

In some embodiments, the system (100) comprises a tubular container extension (300). In some embodiments, a container extension bottom end (302) is removably located on the container top (161). In some embodiments, the container lid (190) is removably located on a container extension top end (301). In some embodiments, the container extension (300) is designed to extend the blending container (160) upwardly and increase the volume contained therein. In some embodiments, the container extension (300) is about 1 inch in height. In some embodiments, the container extension (300) is about 2 inches in height. In some embodiments, the container extension (300) is about 3 inches in height. In some embodiments, the container extension (300) comprises a locking tab (180) disposed on a container extension side wall proximal to the container extension bottom end (302) for locking into a slot (117) disposed on the blending container (160) proximal to the container top (161).

In some embodiments, a food feeder aperture (303) having a sliding door (304) is located on the container side wall (163). In some embodiments, a food feeder aperture (303) having a sliding door (304) is located on a container extension side wall.

In some embodiments, a food feeder channel (305) is removably located on the food feeder aperture (303) located on either the container side wall (163) or the container extension side wall. In some embodiments, when the food feeder channel (305) is removed from the food feeder aperture (303), the sliding door (304) sealably covers the food feeder aperture (303). In some embodiments, a food feeder pusher is used to force food down the food feeder channel (305).

In some embodiments, a handle (306) is removably located on the container side wall (163). In some embodiments, a first handle attachment point (309) and a second handle attachment point (310) are located on the container side wall (163). In some embodiments, the handle first end (307) slides and locks into the first handle attachment point (309). In some embodiments, the handle second end (308) slides and locks into the second handle attachment point (310).

As used herein, the term "about" refers to plus or minus 10% of the referenced number.

The disclosures of the following U.S. Patents are incorporated in their entirety by reference herein: U.S. Pat. No. D 281,945; U.S. Patent Pub. No. 2002/0089894; U.S. Pat. No. 7,766,540; U.S. Pat. No. 7,717,613; U.S. Pat. No. 7,422,362; U.S. Pat. No. 6,959,562, U.S. Pat. No. 6,609,821, U.S. Pat. No. 4,887,909; and U.S. Pat. No. 4,487,509.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A compact portable blender system (100) for blending fruits, vegetables, ice, and liquid while traveling, wherein the system (100) comprises:
   (a) a base unit (110) having a base top (111), a base bottom (112), and a base side wall (113),
   wherein the base top (111) comprises a recess (115) disposed therein, wherein the recess (115) comprises an "L" shaped locking slot (117) disposed on a recess interior surface side wall (116),
   wherein the base unit (110) comprises a motor (120) with a drive gear (121) centrally disposed on the base top (111),
   wherein the base unit (110) comprises a removable power supply (125) disposed on the base bottom (112), wherein the removable power supply (125) is operatively connected to the motor (120),
   wherein the base unit (110) comprises a power charger (130) disposed therein, wherein the power charger (130) is operatively connected to the power supply (125), wherein a removable cord (135) is operatively connected to the power charger (130) via a port (140) disposed on the base side wall (113), wherein the cord (135) comprises an end designed to insert into a direct current charging port, wherein a cord storage cavity (145) is disposed in the base unit (110) for storing the cord (135),
   wherein the base unit (110) comprises a power switch (150) disposed on the base side wall (113), wherein the power switch (150) is operatively connected to the motor (120), wherein the base unit (110) comprises a power indicator (155) disposed on the base side wall (113), wherein the power indicator (155) is operatively connected to the power supply (125);
   (b) a blending container (160) having an open container top (161), a container bottom (162), and a conical container side wall (163),
   wherein a blending blade unit (165) is disposed on the container bottom (162), wherein the blending blade unit (165) comprises a blade drive gear (170) disposed on a blending blade unit bottom (167), wherein the blade drive gear (170) interfaces with the drive gear (121), wherein the blending blade unit (165) comprises a blending blade (175) rotatably disposed on a blending blade unit top (166),
   wherein the blending blade unit (165) comprises a locking tab (180) disposed on a blending blade unit side wall (168), wherein a volume measurement indicator (185) is disposed on the container side wall (163);
   (c) a container lid (190), wherein the container lid (190) comprises an aperture (200) disposed thereon, wherein the container lid (190) comprises a cover (205) slidably disposed over the aperture (200) on a container lid top (191) thereon;
   (d) a tubular container extension (300), wherein a container extension bottom end (302) is removably disposed on the container top (161), wherein the container extension (300) is designed to extend the blending container (160) upwardly and increase the volume contained therein, wherein the container lid (190) is removably disposed on either the container top (161) or on a container extension top end (301); and
   (e) a food feeder aperture (303) having a sliding door (304) disposed on either the container side wall (163) or a container extension side wall, wherein a food feeder channel (305) is removably disposed on the food feeder aperture (303), wherein when the food feeder channel (305) is removed from the food feeder aperture (303), the sliding door (304) sealably covers the food feeder aperture (303), wherein a food feeder pusher is used to force food down the food feeder channel (305), wherein the food feeder channel (305) dispenses food into the blending container above the blending blade (175) and below the container lid (190).

2. The system (100) of claim 1, wherein the blending container (160) is constructed from a glass or a clear, dishwasher-safe plastic.

3. The system (100) of claim 1, wherein the blending container (160) comprises a diameter between 2½" to 3" proximal to the container bottom (162), wherein the blending container (160) is designed to be placed in a drink holder of an automobile.

4. The system (100) of claim 1, wherein the system (100) comprises a travel bag, wherein the travel bag is designed to fully contain the blender system (100).

5. The system of claim 1, wherein a handle (306) is removably disposed on the container side wall (163), wherein a first handle attachment point (309) and a second handle attachment point (310) are located on the container side wall (163), wherein the handle first end (307) slides and locks into the first handle attachment point (309), wherein the handle second end (308) slides and locks into the second handle attachment point (310).

6. A compact portable blender system (100) for blending fruits, vegetables, ice, and liquid while traveling, wherein the system (100) consists of:
   (a) a base unit (110) having a base top (111), a base bottom (112), and a base side wall (113),
   wherein a recess (115) is disposed on the base top (111), wherein the recess (115) is an "L" shaped locking slot (117) disposed on a recess interior surface side wall (116),
   wherein a motor (120) with a drive gear (121) is centrally disposed on the base top (111), wherein a removable power supply (125) is disposed on the base bottom (112), wherein the removable power supply (125) is operatively connected to the motor (120),
   wherein a power charger (130) is disposed in the base unit (110), wherein the power charger (130) is operatively connected to the power supply (125), wherein a removable cord (135) is operatively connected to the power charger (130) via a port (140) disposed on the base side wall (113), wherein an end of the cord (135) is designed to insert into a direct current charging port, wherein a cord storage cavity (145) is disposed in the base unit (110) for storing the cord (135), wherein a power switch (150) is disposed on the base side wall (113), wherein the power switch (150) is operatively connected to the motor (120), wherein a power indicator (155) is disposed on the base side wall (113), wherein the power indicator (155) is operatively connected to the power supply (125);

(b) a blending container (160) having an open container top (161), a container bottom (162), and a conical container side wall (163), wherein a blending blade unit (165) is disposed on the container bottom (162), wherein a blade drive gear (170) is disposed on a blending blade unit bottom (167), wherein the blade drive gear (170) interfaces with the drive gear (121), wherein a blending blade (175) is rotatably disposed on a blending blade unit top (166), wherein a locking tab (180) is disposed on a blending blade unit side wall (168), wherein a volume measurement indicator (185) is disposed on the container side wall (163);

(c) a container lid (190) removably disposed on the container top (161), wherein an aperture (200) is disposed on the container lid (190), wherein the a cover (205) is slidably disposed over the aperture (200) on a container lid top (191);

(d) a tubular container extension (300), wherein a container extension bottom end (302) is removably disposed on the container top (161), wherein the container extension (300) is designed to extend the blending container (160) upwardly and increase the volume contained therein, wherein the container lid (190) is removably disposed on either the container top (161) or on a container extension top end (301); and (e) a food feeder aperture (303) having a sliding door (304) disposed on either the container side wall (163) or a container extension side wall, wherein a food feeder channel (305) is removably disposed on the food feeder aperture (303), wherein when the food feeder channel (305) is removed from the food feeder aperture (303), the sliding door (304) sealably covers the food feeder aperture (303), wherein a food feeder pusher is used to force food down the food feeder channel (305), wherein the food feeder channel (305) dispenses food into the blending container above the blending blade (175) and below the container lid (190).

\* \* \* \* \*